US012553722B2

(12) United States Patent
Hada

(10) Patent No.: US 12,553,722 B2
(45) Date of Patent: Feb. 17, 2026

(54) SYSTEM AND METHOD FOR PROVIDING A SAFE PATH FOR AN OCCUPANT OF A VEHICLE TO UTILIZE AFTER EXITING THE VEHICLE

(71) Applicant: Toyota Motor Engineering & Manufacturing North America, Inc., Plano, TX (US)

(72) Inventor: Hideki Hada, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 88 days.

(21) Appl. No.: 18/444,880

(22) Filed: Feb. 19, 2024

(65) Prior Publication Data

US 2025/0264335 A1   Aug. 21, 2025

(51) Int. Cl.
*G01C 21/20*      (2006.01)
*B60W 60/00*      (2020.01)

(52) U.S. Cl.
CPC ....... *G01C 21/206* (2013.01); *B60W 60/0025* (2020.02)

(58) Field of Classification Search
CPC .......................... G01C 21/206; B60W 60/0025
See application file for complete search history.

(56) References Cited

U.S. PATENT DOCUMENTS

| 10,081,390 | B1 | 9/2018 | Anderson et al. |
| 11,605,293 | B2 | 3/2023 | Lee |
| 11,803,783 | B2 | 10/2023 | Dekusar et al. |
| 2006/0178821 | A1* | 8/2006 | Brulle-Drews .... G01C 21/3685 701/431 |
| 2019/0079518 | A1* | 3/2019 | Arakawa ............... G05D 1/0246 |
| 2020/0018602 | A1* | 1/2020 | Beaurepaire ........... G08G 1/146 |
| 2020/0064141 | A1* | 2/2020 | Bell ..................... G09B 21/006 |
| 2024/0400038 | A1* | 12/2024 | Neely .................. G05D 1/0212 |

FOREIGN PATENT DOCUMENTS

| CN | 116403433 A | 7/2023 |
| DE | 102013015349 A1 | 4/2014 |
| JP | 4817015 B2 | 11/2011 |

* cited by examiner

*Primary Examiner* — Aaron L Troost
(74) *Attorney, Agent, or Firm* — Christopher G. Darrow; Darrow Mustafa PC

(57) ABSTRACT

Disclosed are systems, methods, and other embodiments for providing a safe path for an occupant of a vehicle to utilize after exiting the vehicle. In one example, a system includes a processor and a memory having instructions that, when executed by the processor, cause the processor to determine, based on vehicle sensor data, a safe path from a vehicle parked at a parking location to a destination for an occupant of the vehicle to utilize after exiting the vehicle and provide information regarding the safe path to the occupant of the vehicle.

20 Claims, 9 Drawing Sheets

SYSTEM AND METHOD FOR PROVIDING A SAFE PATH FOR AN OCCUPANT OF A VEHICLE TO UTILIZE AFTER EXITING THE VEHICLE

TECHNICAL FIELD

The subject matter described herein relates, in general, to systems and methods for assisting occupants of a vehicle after exiting a vehicle and, more specifically, to providing occupants with information regarding a safe path they should utilize after exiting the vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

When parking a vehicle at a particular location, such as a residential garage, the occupant of the vehicle, after parking the vehicle, exits the vehicle and proceeds towards another destination, such as a door, elevator, etc. In some cases, the walkable area between the vehicle and the other destination is free of objects and easy to navigate. However, especially in the cases of residential garages, numerous objects may be present within the garage, such as other vehicles, lawn equipment, children's toys, tools, seasonally stored items, garbage containers, electrical cords, garden hoses, and the like. Navigating from the vehicle to the other destination can be difficult for occupants, especially occupants having mobility difficulties.

SUMMARY

This section generally summarizes the disclosure and is not a comprehensive explanation of its full scope or all its features.

In one embodiment, a system for providing a safe path to an occupant of a vehicle includes a processor and a memory in communication with the processor. The memory includes an instruction module having instructions that, when executed by the processor, cause the processor to determine, based on vehicle sensor data, a safe path from the vehicle parked at a parking location to a destination for the occupant of the vehicle to utilize when exiting the vehicle and provide information regarding the safe path to the occupant of the vehicle.

In another embodiment, a method for providing a safe path to an occupant of a vehicle includes the steps of determining, based on vehicle sensor data, a safe path from the vehicle parked at a parking location to a destination for the occupant of the vehicle to utilize when exiting the vehicle and providing information regarding the safe path to the occupant of the vehicle.

In yet another embodiment, a non-transitory computer-readable medium includes instructions that, when executed by a processor, cause the processor to determine, based on vehicle sensor data, a safe path from a vehicle parked at a parking location to a destination for an occupant of the vehicle to utilize after exiting the vehicle and provide information regarding the safe path to the occupant of the vehicle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems, methods, and other embodiments for providing a safe path to an occupant of the vehicle so that an occupant may safely move between their vehicle and another destination, such as a door leading to a residential area. In one example, the safe path system collects vehicle sensor data when the vehicle is located within and/or is entering a parking location, such as a residential garage. The safe path system can generate an electronic representation of the parking location, including the location of any objects located within the parking location. For example, if the parking location is a residential garage, the safe path system can generate an electronic representation of the residential garage, including the location of any objects within the residential garage, such as garbage bins, other vehicles, lawn equipment, toys, etc.

In addition to generating the electronic representation, the safe path system can also determine a safe path for one or more occupants of the vehicle to utilize after exiting the vehicle so as to reach the other destination without potentially being hindered by objects located near the parking location. The system may take into account the mobility needs of the occupants when generating a safe path. For example, if the occupant has limited mobility and requires the use of crutches, wheelchairs, or other aids, the safe path system may generate a safe path that has a greater width between objects and/or is shorter so as to allow easier and safer movement of the occupant to the other destination. The safe path system can also utilize sensor data from the vehicle sensors to monitor the movement of the occupant after the occupant has exited the vehicle and can provide feedback to the occupant when traveling along the safe path so that the occupant can safely reach their destination. For example, as the occupant approaches a bicycle near the safe path, the vehicle can audibly inform the occupant to "watch out for the bicycle on your left."

Figure 1:
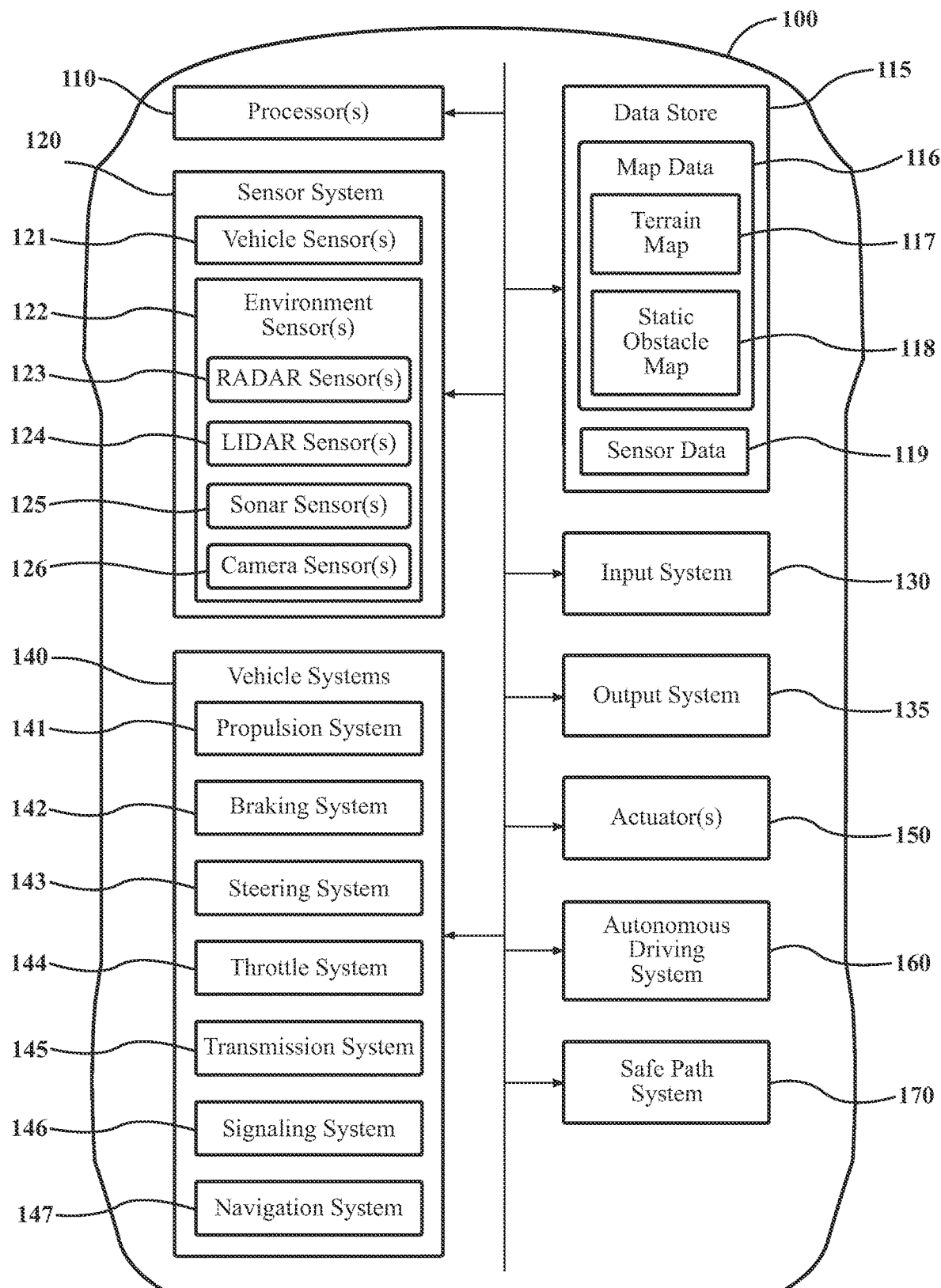
FIG. 1 illustrates a block diagram of a vehicle incorporating a system for providing a safe path to an occupant of a vehicle.

Referring to FIG. 1, an example of a vehicle 100 is illustrated that may incorporate a safe path system 170. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to an autonomous driving system 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

Figure 2:
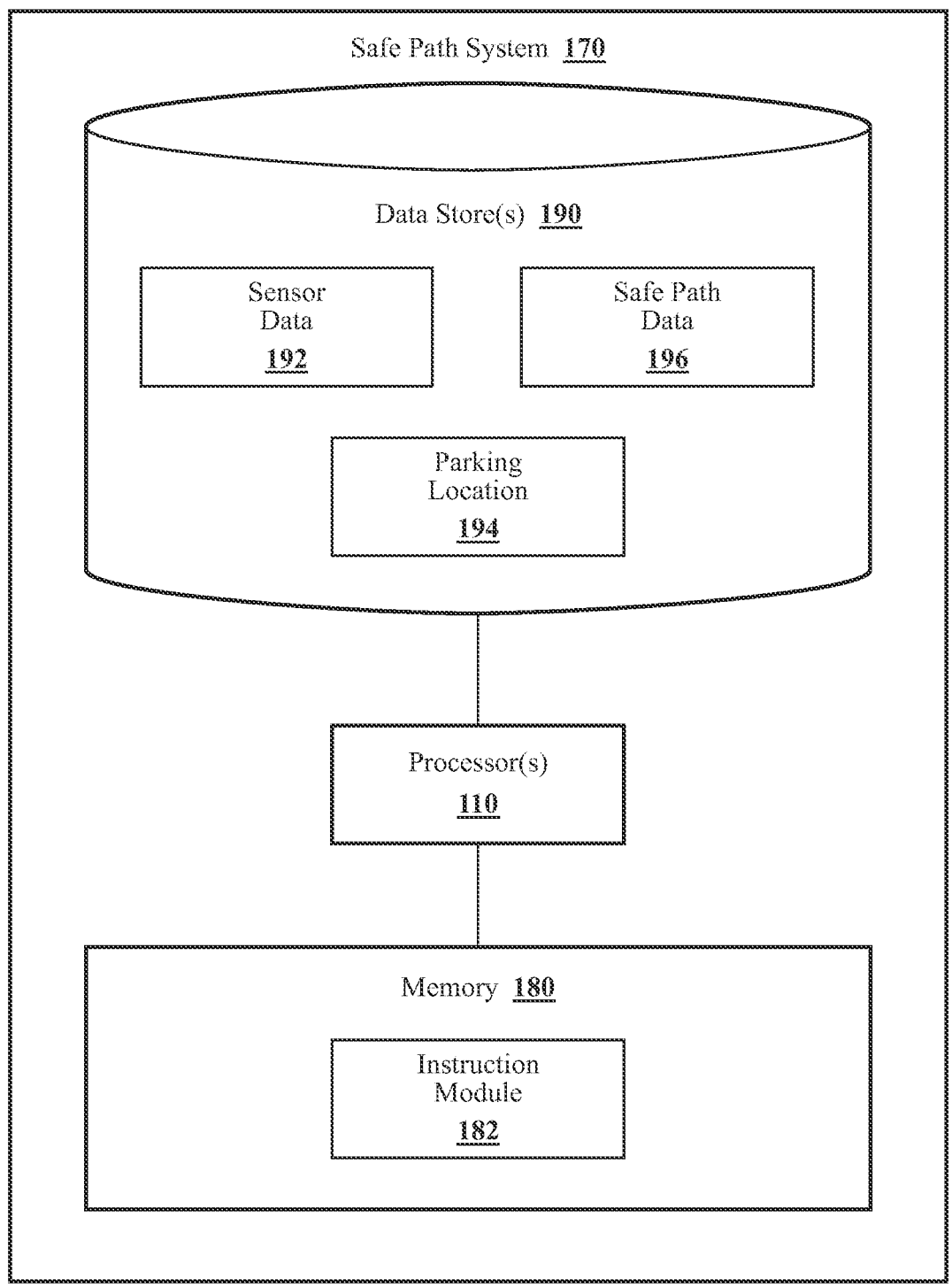
FIG. 2 illustrates a more detailed view of the system for providing a safe to an occupant of a vehicle.
Figure 3:
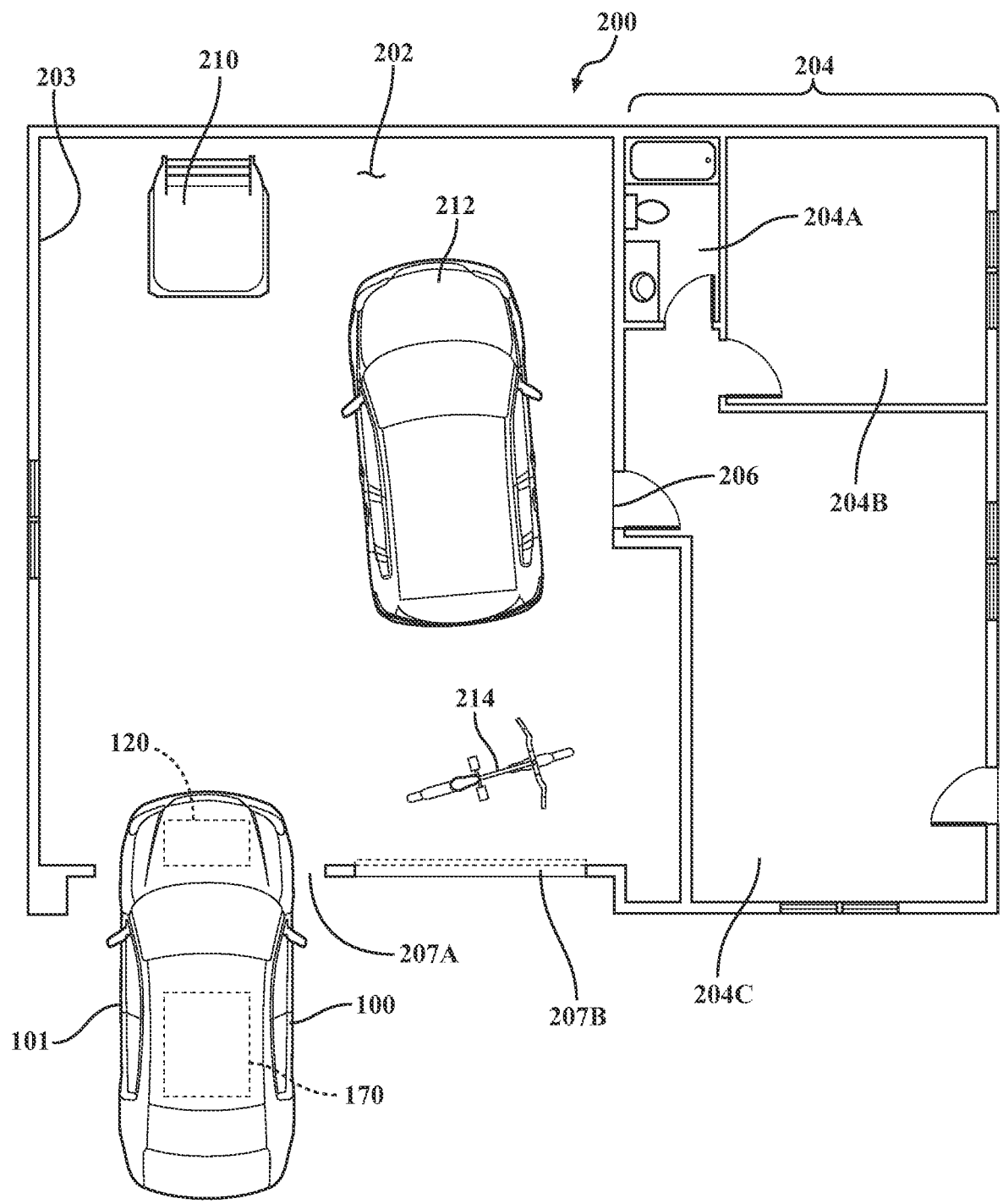
FIGS. 3 and 4 illustrate one example of a scenario wherein the system provides a safe path to an occupant of the vehicle.
Figure 4:
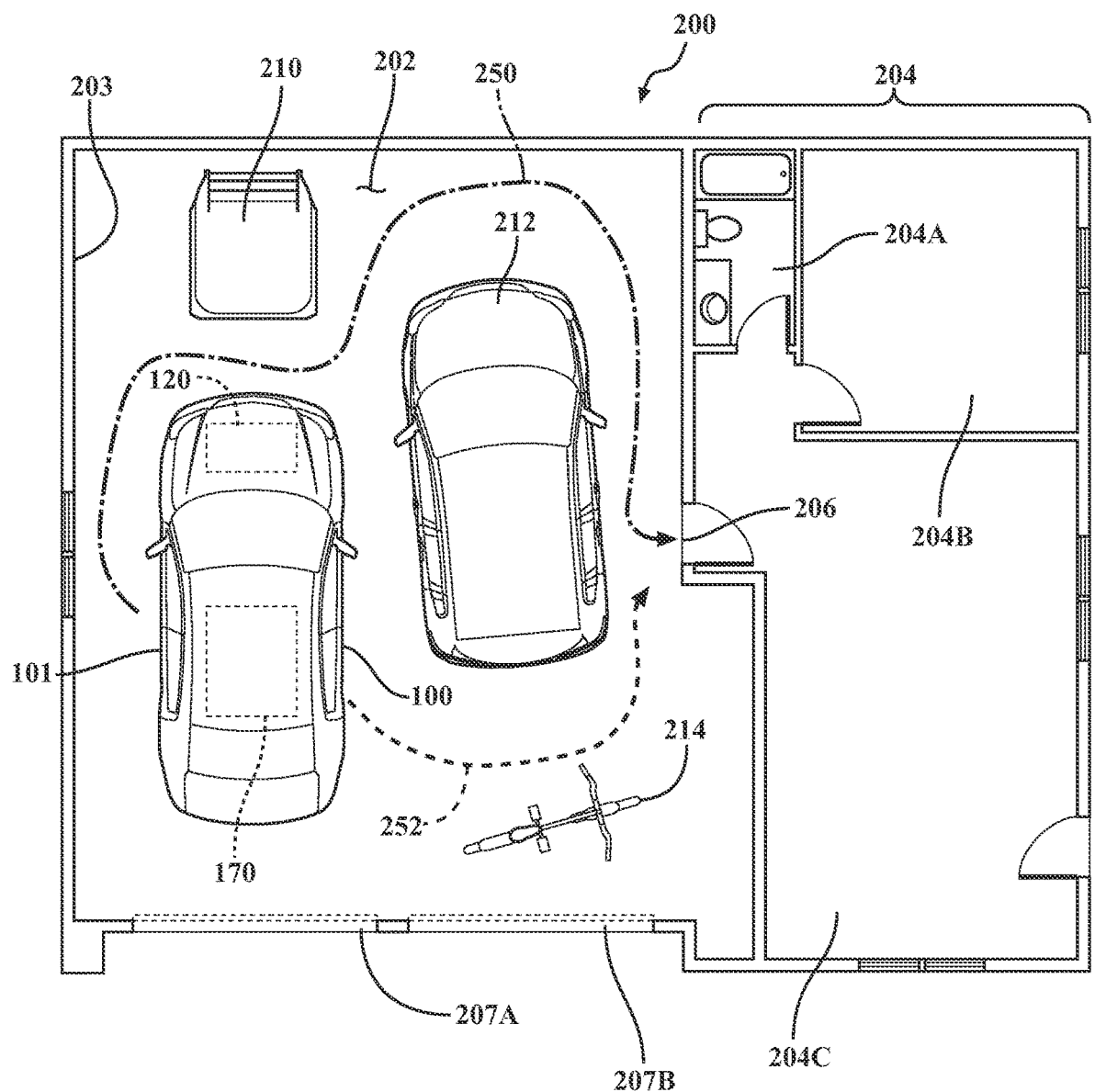

In either case, the vehicle 100 includes a safe path system 170. With reference to FIG. 2, one embodiment of the safe path system 170 is further illustrated. As shown, the safe path system 170 includes a processor(s) 110. Accordingly, the processor(s) 110 may be a part of the safe path system 170, or the safe path system 170 may access the processor(s) 110 through a data bus or another communication path. In one or more embodiments, the processor(s) 110 is an application-specific integrated circuit that is configured to implement functions associated with an instruction module 182.

In general, the processor(s) 110 is an electronic processor, such as a microprocessor, which is capable of performing various functions as described herein. In one embodiment, the safe path system 170 includes a memory 180 that stores the instruction module 182. The memory 180 may be a random-access memory (RAM), read-only memory (ROM), a hard disk drive, a flash memory, or other suitable memory for storing the instruction module 182. The instruction module 182 is, for example, computer-readable instructions that, when executed by the processor(s) 110, cause the processor(s) 110 to perform the various functions disclosed herein.

Furthermore, in one embodiment, the safe path system 170 includes a data store(s) 190. The data store(s) 190 is, in one embodiment, an electronic data structure such as a database that is stored in the memory 180 or another memory and that is configured with routines that can be executed by the processor(s) 110 for analyzing stored data, providing stored data, organizing stored data, and so on. Thus, in one embodiment, the data store(s) 190 stores data used by the instruction module 182 in executing various functions.

In one embodiment, the data store(s) 190 includes sensor data 192, parking location data 194, and/or safe path data 196. The sensor data 192 may include vehicle sensor data collected by the vehicle 100 from one or more sensors making up the sensor system 120, as best shown in FIG. 1. The parking location data 194 may include data related to the parking location where the vehicle 100 may park. The parking location data 194 could also include sensor data collected by the vehicle from one or more sensors making up the sensor system 120, but can also include other data such as electronic representations of the parking location. For example, if the parking location is a garage, the dimensions of the garage, the location of a door that exits the garage, the location of objects previously detected when parking in the garage, etc. The safe path data 196 may include data related to a safe path that was calculated for a particular parking location that indicates a path one or more occupants of the vehicle 100 should utilize in order to reach the destination, such as a residential door of a garage. It should be understood that the data stored in the data store(s) 190 previously described are just an example of some of the data that may be stored within. Other data, or different data altogether, used by the instruction module 182 in executing various functions may also be stored within the data store(s) 190.

As mentioned before, the instruction module 182 includes instructions that cause the processor(s) 110 to execute any of the methodologies described herein. In order to better visualize some of the methodologies, reference is made to FIG. 3. Here, illustrated is a structure 200, which includes a parking location in the form of a residential garage 202. The structure 200 also includes a residential area 204 that can be accessed via a door 206 from the residential garage 202. The residential area 204 may include several rooms, such as rooms 204A-204C. The residential garage 202 may also include one or more garage doors, such as garage doors 207A-207B, that allow vehicles to enter/exit the residential garage 202. While the parking location is shown to be a residential garage 202, it should be understood that the parking location can take any one of a number of different forms and is not limited to residential garages, as shown. For example, the parking location can be any location where vehicles may park, such as street parking, a parking structure, a parking lot, an open field, and the like.

In this example, the residential garage 202 includes several objects, including a garbage bin 210, a parked vehicle 212, and a parked bicycle 214. It should be understood that this is just an example of the type of objects that may be found in the residential garage 202 and should not be limited to just those specifically mentioned. For example, numerous different types of objects can be located within the residential garage 202, such as lawn equipment, agricultural equipment, hoses, extension cords, toys, tricycles, stored seasonal goods, animal care facilities, furniture, appliances, and so on.

Also shown is the vehicle 100, which includes the sensor system 120 and the safe path system 170, entering the residential garage 202 via the garage door 207A. In this case, the vehicle 100 may be manually parked by an occupant of the vehicle 100 or may be automatically parked by one or more autonomous systems of the vehicle, such as the autonomous driving system 160, which will be described in greater detail later. In one example, the instruction module 182 includes instructions that cause the processor(s) 110 to actuate one or more actuators 150 of the vehicle 100 to park the vehicle within the residential garage 202. In further examples, the instruction module 182 may also include instructions that cause the processor(s) 110 to consider the egress needs of one or more occupants of the vehicle when parking the vehicle 100 within the residential garage 202. For example, in situations where the occupant may need additional space to safely exit/enter the vehicle 100, the instruction module 182 may cause the processor(s) 110 to control the actuators such that additional space is provided between the vehicle 100 and a wall 203 of the structure 200 that is located near a driver door 101 of the vehicle 100. Again, it should be understood that the vehicle 100 does not necessarily need to include an autonomous parking system that considers the egress requirements of the occupants.

The instruction module 182 includes instructions that, when executed by the processor(s) 110, cause the processor(s) 110 to receive sensor data generated by the sensor system 120. The sensor system 120, as will be explained later, can include any one of a number of different sensors, such as radar sensor(s) 123, LIDAR (light detection and ranging) sensor(s) 124, sonar sensor(s) 125, camera sensor(s) 126, and the like. These sensors can sense the environment, including the residential garage 202 and any objects located within the residential garage, such as the garbage bin 210, the parked vehicle 212, and the bicycle 214. Again, as explained previously, the examples given of the objects located within the residential garage 202 are merely examples and any type of object located within the residential garage 202 that may be detected by the sensor system 120 of the vehicle 100. The sensor data generated by the sensor system 120 may be stored within the data store(s) 190 as the sensor data 192.

The instruction module 182 includes instructions that, when executed by the processor(s) 110, cause the processor(s) 110 to generate an electronic representation of the environment, such as the residential garage 202 and the objects located within the residential garage 202, such as the garbage bin 210, the parked vehicle 212, and the bicycle 214. Essentially, the sensor data 192 is used to construct the electronic representation of the residential garage 202 and the objects located within the residential garage 202 using detected position data of the walls of the residential garage 202, any doors, such as the door 206, and the objects, such as the garbage bin 210, the parked vehicle 212, and the bicycle 214. In addition to the sensor data 192 other types of data, such as the parking location data 194 can also be utilized. For example, the parking location data 194 can include either previously collected sensor data and/or other data that may include the dimensions of the residential garage 202 and/or the location of doors, such as the door 206. By using data in addition to that collected from the sensor system 120, it may be possible to generate more accurate electronic representations of the environment in which the vehicle 100 may be parked. Furthermore, the parking location data 194 may also include previously generated electronic representations of the residential garage 202 and the location of objects within the residential garage 202. In some cases, the instruction module 182 may cause the processor(s) 110 to update/remove/add objects to/from the electronic representation of the residential garage 202 detected at a later time by the sensor system 120 of the vehicle 100.

Once the electronic representation of the environment has been created, the instruction module 182 may then cause the processor(s) 110 to determine, based on the sensor data 192, a safe path from the vehicle 100 parked at a parking location, in this case, the residential garage 202 to a destination (i.e., the door 206) for the occupant of the vehicle 100 to utilize after exiting the vehicle 100. For example, referring to FIG. 4, the processor(s) 110 has generated the safe path 250 for the driver to utilize to reach the door 206, which leads to the residential area 204 of the structure 200. The instruction module 182 can also cause the generation of multiple safe paths if multiple occupants are within the vehicle 100. For example, another safe path 252 may be generated for an occupant located in the passenger side rear seat of the vehicle 100. It should be understood that the destination, such as the door 206, may vary from situation to situation. For example, instead of the destination being a door, the destination could be a stairwell, an elevator, and the like.

The safe paths 250 and/or 252 can be generated using a number of different algorithms. For example, the safe path 250 and/or 252 can be generated so as to generally provide information regarding the location of objects and provide enough space between the objects and/or structures, such as walls making up the residential garage 202. In some cases, the safe path generated by the processor(s) 110 may be the shortest, but it can also be a path having the greatest distance between objects and/or structures, such as walls, thereby allowing maximum space between the objects and/or structures to more easily allow the occupant to navigate to the destination, in this case, the door 206 leading to the residential area 204 of the structure 200.

Other types of considerations can also form the basis for generating the safe paths 250 and/or 252. For example, in addition to the location of particular objects, object type may also be considered when generating the safe paths 250 and/or 252. For example, if the occupant is known by the safe path system 170 to not like certain smells, a safe path may be generated that generally avoids the garbage bin 210. In some cases, a detected object may be particularly dangerous, such as a chainsaw, chemicals, etc. As such, the instruction module 182 may cause the processor(s) 110 to consider the overall danger of the object in generating the safe paths. For example, if an object is an open can of gasoline, the instruction module 182 may cause the processor(s) 110 to generate a safe path that generally avoids this danger as best possible.

Figure 5:
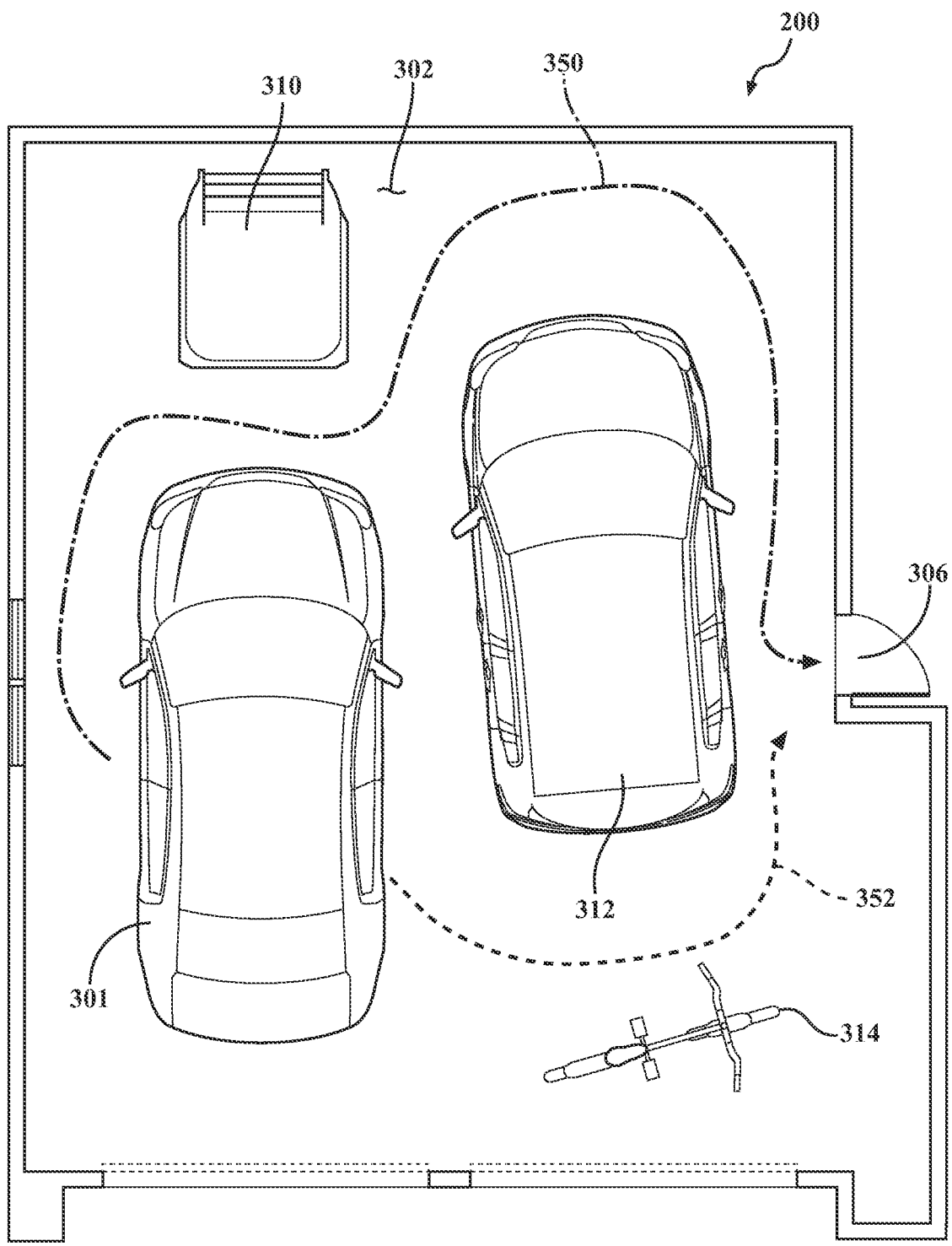
FIG. 5 illustrates one example of an electronic representation of a safe path provided to an occupant of the vehicle.
Figure 6A:
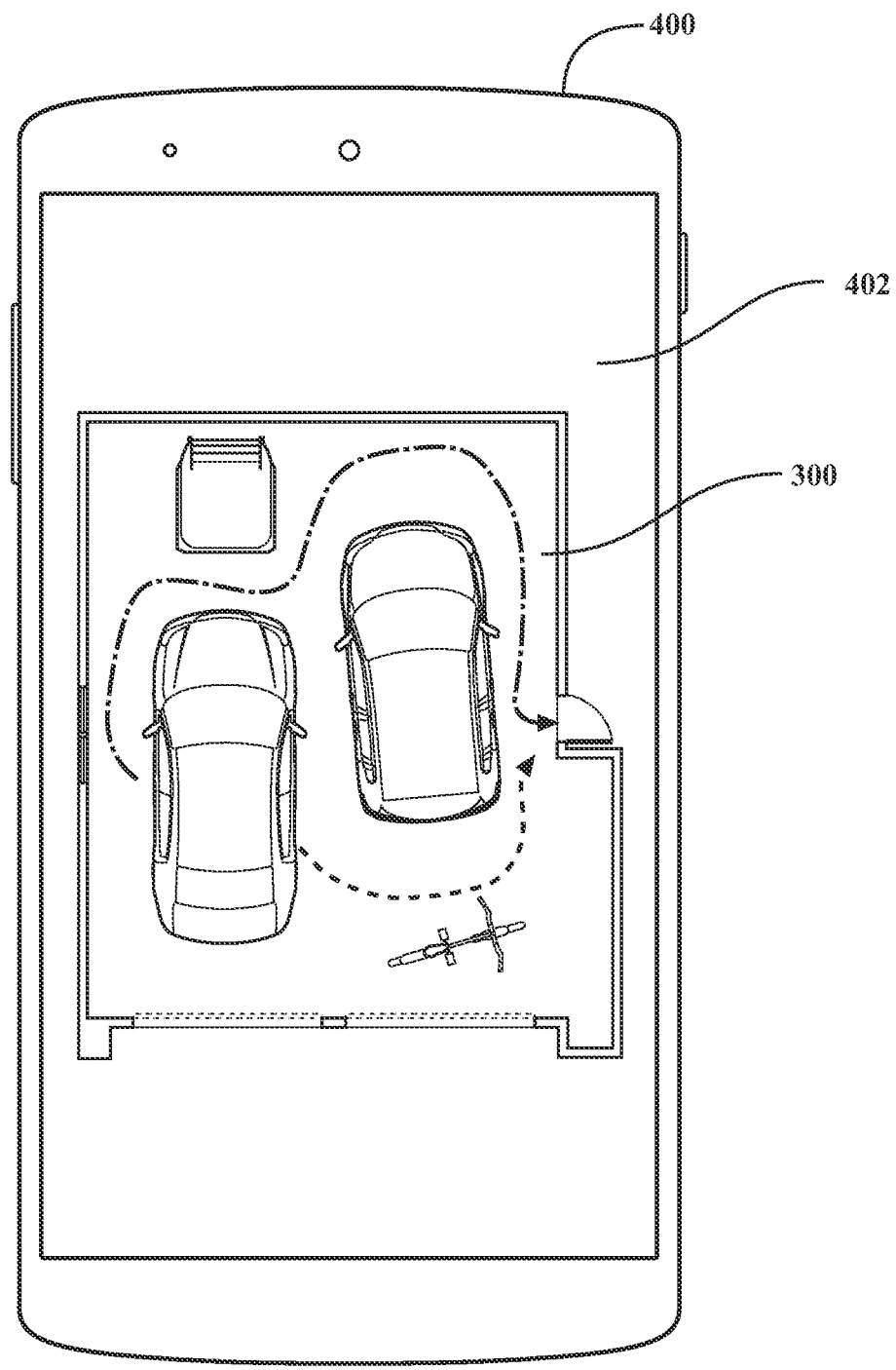
FIGS. 6A and 6B illustrate different examples of providing a safe path to the occupant of the vehicle.
Figure 6B:
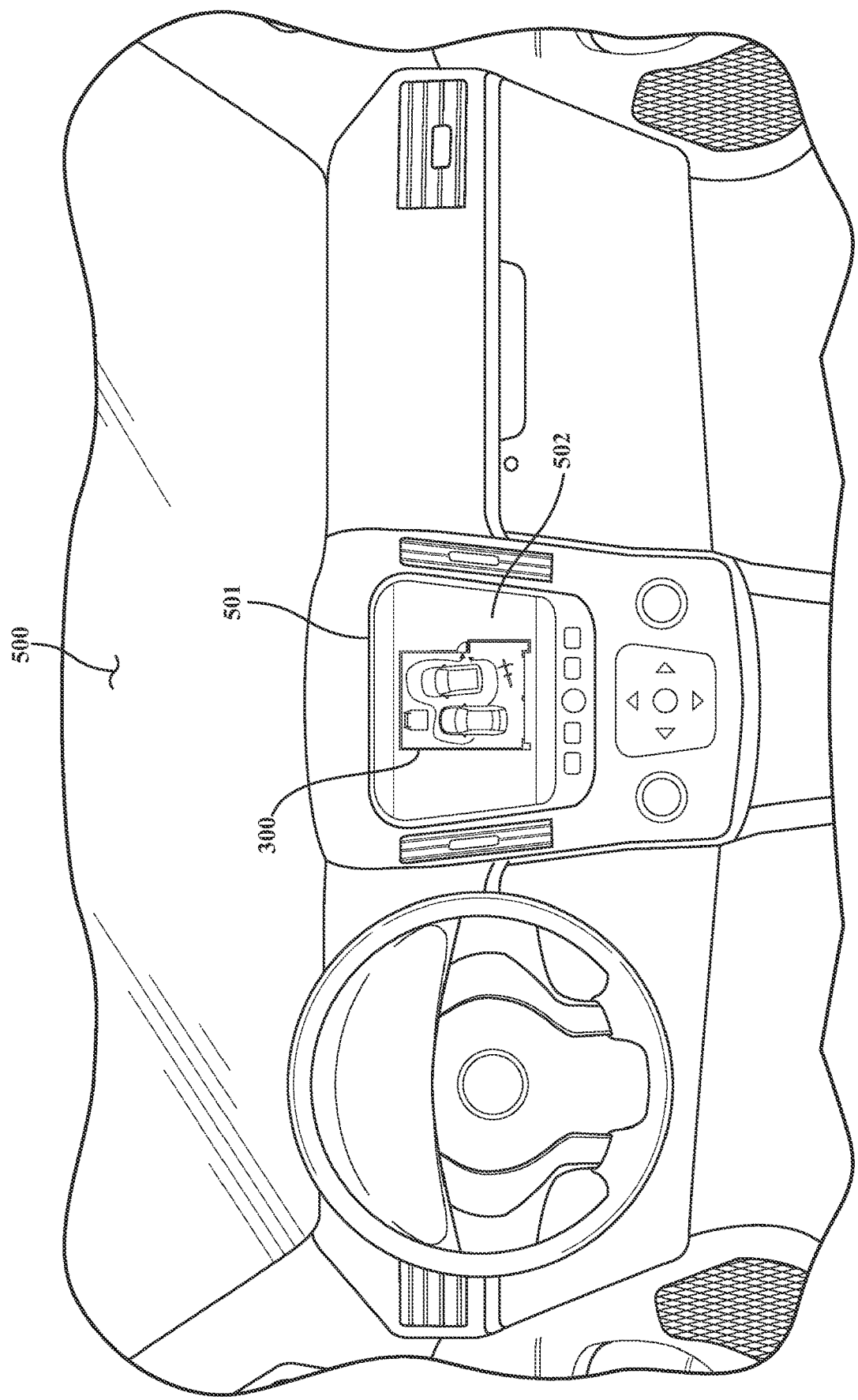

As best shown in FIG. 5, illustrated is one example of an electronic representation 300. The electronic representation 300 includes an electronic representation of the vehicle 301 parked in the garage 302, as well as electronic representations of a garbage bin 310, a parked vehicle 312, and a bicycle 314 that are based on the location of the actual objects of the garbage bin 210, the parked vehicle 212, and the bicycle 214, shown in FIGS. 3 and 4. In this example, the electronic representation 300 is a birds-eye-view view of the environment that the vehicle 100 is parked within based on the sensor data 192. Also shown are electronic representations of the safe paths 350 and 352, leading to a door 306, which is an electronic representation of the door 206 of FIGS. 3 and 4. As such, the electronic representations are a form of virtual representation that can be stored and shared electronically.

Once the safe paths 350 and/or 352 have been generated by the processor(s) 110, the instruction module 182 includes instructions that, when executed by the processor(s) 110, cause the processor to provide information regarding the safe paths 350 and/or 352 to one or more occupants of the vehicle 100. The providing of information regarding the safe paths 350 and/or 352 can take any one of a number of forms, such as visual and/or audible. For example, referring to FIGS. 6A and 6B, the electronic representation 300 of the birds-eye-view of the environment may be visually provided to an occupant via a display area 402 of a mobile device 400 and/or a display area 502 of a vehicle head unit 501 located within the cabin 500 of the vehicle 100. Of course, it should be understood that information regarding the safe paths 350 and/or 352 that one or more occupants of the vehicle 100 should utilize can be provided to them in any suitable fashion and not limited to just those shown and described in FIGS. 6A and 6B.

Figure 7:
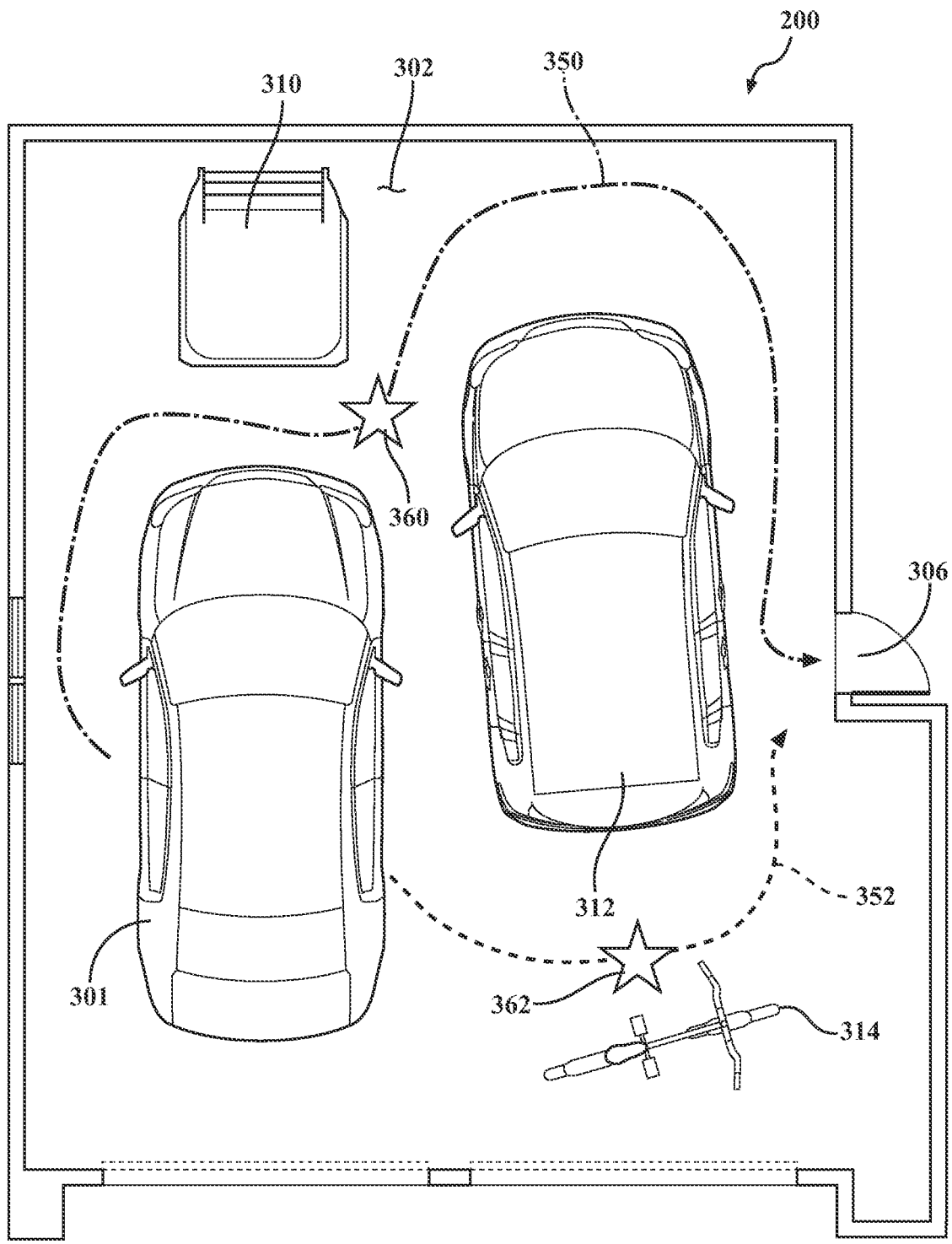
FIG. 7 illustrates another example of an alternative electronic representation of a safe path provided to an occupant of a vehicle that includes occupant location along the safe path.

In addition to providing information regarding the safe paths 350 and/or 352 to one or more occupants of the vehicle 100, other information, including feedback, can also be provided to the occupants of the vehicle. For example, referring to FIG. 7, illustrated is the electronic representation 300, including the safe paths 350 and 352. Also shown may be the locations 360 and 362 of the occupants as they travel along the safe paths 350 and 352, respectively. In particular, the locations 360 and/or 362 may be provided to the occupants if they are utilizing a mobile device, such as the mobile device 400 of FIG. 6A. Information to determine the progress of the occupants as they travel along the safe paths 350 and 352 may be provided to the processor(s) 110 from the sensor system 120 of the vehicle 100 and/or may be augmented by information provided by a mobile device that is in possession of the occupants as they travel along the safe paths 350 and 352. As such, the instruction module 182 causes the processor(s) 110 to collect additional sensor data from the sensor system 120, determine the location of the occupants within the residential garage 202, and then transmit this information to a mobile device that is configured to provide the information regarding the safe path 350 and/or 352 to the occupants, as well as their location along the safe paths 350 and/or 352.

Other types of feedback can also be provided, such as audible feedback. For example, the instruction module 182 may cause the processor(s) 110 to monitor the movement of the occupants along the safe paths 350 and/or 352 using the vehicle sensor data collected from the sensor system 120. As the occupants move along the safe paths 350 and/or 352, the vehicle 100 may audibly provide feedback to the occupants regarding the location of upcoming objects, how far away they are from the door 206, general encouragement, and the like. Further still, the instruction module 182 may cause the processor(s) 110 to monitor the movement of the occupants so as to determine if the occupant is no longer moving. In this case, the instruction module 182 may cause the processor(s) 110 to utilize an audible output device and input device to inquire if the occupant needs assistance and then contact the appropriate parties, such as emergency services, emergency contacts, or others. For example, if it is determined that the occupant is no longer moving, the instruction module 182 may cause the processor(s) 110 to output an audible inquiry to the occupant via the output system 135 and await a response from the occupant using the input system 130, which could be a microphone.

Figure 8:
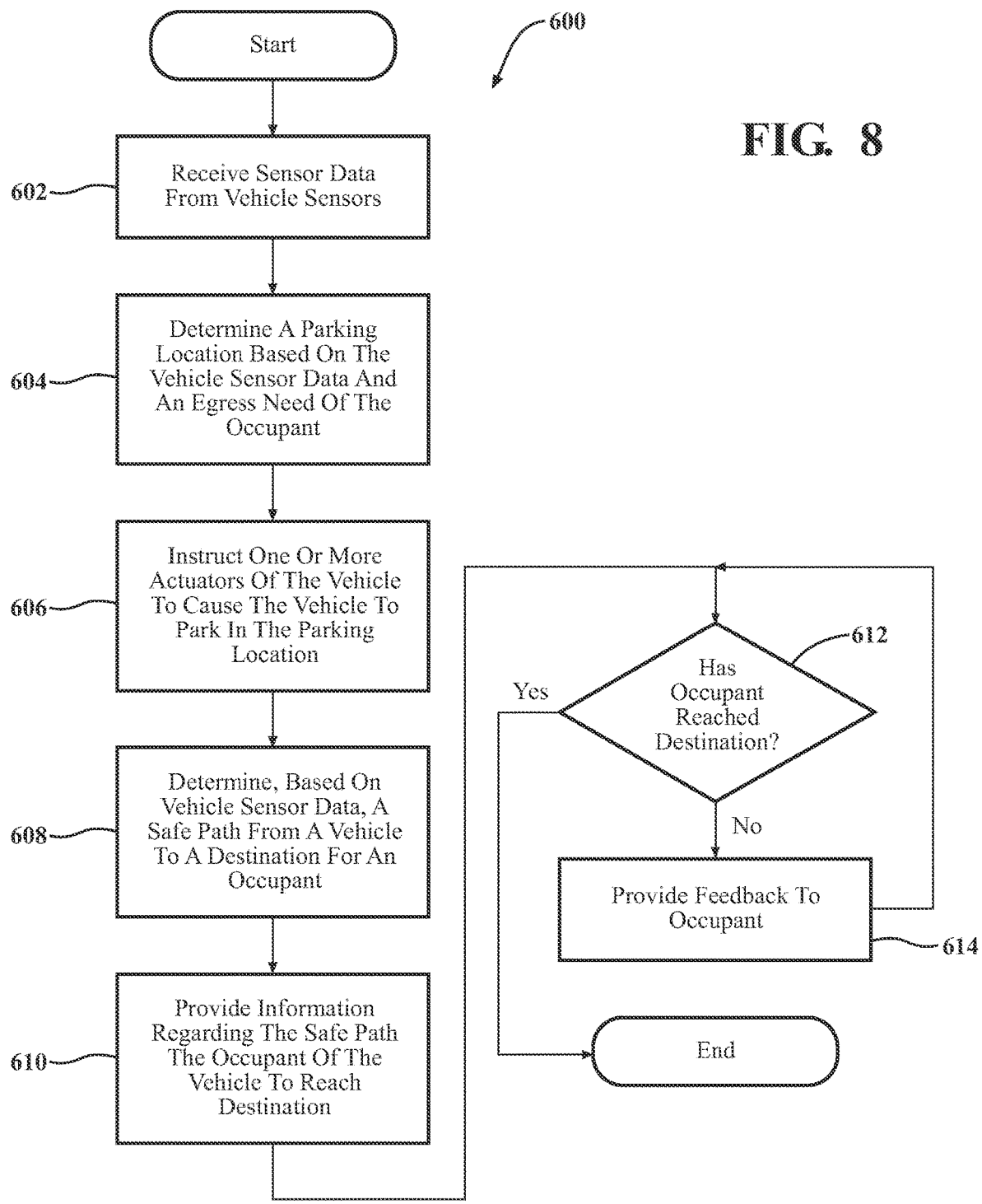
FIG. 8 illustrates a method for providing a safe path to an occupant of the vehicle.

Referring to FIG. 8, a method 600 for determining a safe path for an occupant of a vehicle is shown. The method 600 will be described from the viewpoint of the vehicle 100 of FIG. 1 and the safe path system 170 of FIG. 2. However, it should be understood that this is just one example of implementing the method 600. While method 600 is discussed in combination with the safe path system 170, it should be appreciated that the method 600 is not limited to being implemented within the safe path system 170, but is instead one example of a system that may implement the method 600.

In step 602, the instruction module 182 includes instructions that, when executed by the processor(s) 110, cause the processor(s) 110 to receive sensor data generated by the sensor system 120. Generally, the sensor data generated by the sensor system 120 includes sensor data that can be utilized by the processor(s) 110 to determine the overall environment in which the vehicle 100 may be parked. For example, as explained previously, the sensor data can include information regarding the overall environment, including the location of objects, walls, and the like.

The sensor data collected in step 602 may be utilized to generate an electronic representation of the environment, such as the residential garage 202 and the objects located within the residential garage 202, such as the garbage bin 210, the parked vehicle 212, and the bicycle 214 that the vehicle 100 will be parked within. Essentially, the sensor data 192 is used to construct the electronic representation of the residential garage 202 and the objects located within the residential garage 202 using detected position data of the walls of the residential garage 202, any doors, such as the door 206, and the objects, such as the garbage bin 210, the parked vehicle 212, and the bicycle 214. In addition to the sensor data 192, other types of data, such as the parking location data 194 can also be utilized.

In step 604, which may be optional, the instruction module 182 includes instructions that, when executed by the processor(s) 110, cause the processor(s) 110 to determine a parking location within the sensed environment based on vehicle sensor data and an egress need of the occupant of the vehicle 100. For example, if the occupant requires additional space due to limited mobility or the use of mobility aids, such as crutches, wheelchairs, and the like, the vehicle 100 can be parked such that additional space can be provided. For example, as explained earlier, in situations where the occupant may need additional space to safely exit/enter the vehicle 100, the instruction module 182 may cause the processor(s) 110 to control the actuators such that additional space is provided between the vehicle 100 and a wall 203 of the structure 200 that is located near a driver door 101 of the vehicle 100. Again, it should be understood that this step may be optional.

In step 606, which may be optional, the instruction module 182 includes instructions that, when executed by the processor(s) 110, cause the processor(s) 110 to actuate one or more actuators 150 of the vehicle 100 to park the vehicle within the residential garage 202 based on the vehicle sensor data in the egress needs of the occupant. Again, it should be understood that this step may be optional.

In step 608, the instruction module 182 includes instructions that, when executed by the processor(s) 110, cause the processor(s) 110 to determine, based on the sensor data 192, a safe path from the vehicle 100 parked at a parking location, in this case, the residential garage 202 to a destination (i.e., the door 206) for the occupant of the vehicle 100 to utilize after exiting the vehicle 100. For example, referring to FIG. 4, the processor(s) 110 has generated the safe path 250 for the driver to utilize to reach the door 206, which leads to the residential area 204 of the structure 200. The instruction module 182 can also cause the generation of multiple safe paths if multiple occupants are within the vehicle 100. For example, another safe path 252 may be generated for an occupant located in the passenger side rear seat of the vehicle 100.

In step 610, the instruction module 182 includes instructions that, when executed by the processor(s) 110, cause the processor(s) 110 to provide information regarding the safe paths 350 and/or 352 to one or more occupants of the vehicle 100. The providing of information regarding the safe paths 350 and/or 352 can take any one of a number of forms, such as visual and/or audible. For example, referring to FIGS. 6A and 6B, the electronic representation 300 of the birds-eye-view of the environment may be visually provided to an occupant via a display area 402 of a mobile device 400 and/or a display area 502 of a vehicle head unit 501 located within the cabin 500 of the vehicle 100. Again, it should be understood that information regarding the safe paths 350 and/or 352 that one or more occupants of the vehicle 100 should utilize can be provided to them in any suitable fashion and not limited to just those shown and described in FIGS. 6A and 6B.

As mentioned before, feedback may be provided to an occupant as they travel along a safe path. In step 612, the instruction module 182 includes instructions that, when executed by the processor(s) 110, cause the processor(s) 110 to determine if an occupant has reached the destination at the end of the safe path by monitoring vehicle sensor data collected by the sensor system 120. If the occupant has reached the destination, the method 600 ends. However, if the occupant has not reached the destination, the instruction module 182 includes instructions that, when executed by the processor(s) 110, cause the processor(s) 110 to provide feedback to the occupant, as shown in step 614. For example, the instruction module 182 includes instructions that, when executed by the processor(s) 110, cause the processor(s) 110 to provide feedback to the occupant regarding the location of upcoming objects, how far away they are from the door 206, general encouragement, and the like. As explained earlier, the instruction module 182 may cause the processor(s) 110 to monitor the movement of the occupants so as to determine if the occupant is no longer moving. In this case, the instruction module 182 may cause the processor(s) 110 to inquire if the occupant needs assistance and then contact the appropriate parties, such as emergency services, emergency contacts, or others.

FIG. 1 will now be discussed in full detail as an example environment within which the system and methods disclosed herein may operate. In one or more embodiments, the vehicle 100 may be semi-autonomous or autonomous. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

As mentioned before, the vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, and as mentioned before, in one or more arrangements, the sensor system 120 can include one or more radar sensor(s) 123, one or more LIDAR sensor(s) 124, one or more sonar sensor(s) 125, and/or one or more camera sensor(s) 126. In one or more arrangements, the one or more camera sensor(s) 126 can be high dynamic range (HDR) cameras or infrared (IR) cameras.

The vehicle 100 can include an input system 130. An "input system" includes any device, component, system, element, arrangement or groups thereof that enable information/data to be entered into a machine. The input system 130 can receive an input from a vehicle passenger (e.g., a driver or a passenger). The vehicle 100 can include an output system 135. An "output system" includes any device, component, arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust, and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, to name a few possibilities.

The vehicle 100 can include one or more modules, at least some of which are described herein. The modules can be implemented as computer-readable program code that, when executed by a processor(s) 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features including traffic signs, trees, shrubs, neighboring vehicles, pedestrians, etc.

The autonomous driving system 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor;
   a memory in communication with the processor, the memory including an instruction module having instructions that, when executed by the processor, cause the processor to:
      determine, based on vehicle sensor data, a path from a vehicle parked in a residential garage to a door leading to a residence associated with the residential garage for an occupant of the vehicle to utilize after exiting the vehicle;
      provide information regarding the path to the occupant of the vehicle; and
      provide feedback to the occupant as the occupant moves from the vehicle to the door using the path by monitoring a movement of the occupant along the path using the vehicle sensor data.

2. The system of claim 1, wherein the instruction module further includes instructions that, when executed by the processor, cause the processor to:
   generate a birds-eye-view of an environment that the vehicle is parked within based on the vehicle sensor data and a representation of the path within the birds-eye-view; and
   display the birds-eye-view of the environment and the representation of the path to the occupant.

3. The system of claim 1, wherein the instruction module further includes instructions that, when executed by the processor, cause the processor to transmit the information regarding the path to a mobile device that is configured to provide the information regarding the path to the occupant.

4. The system of claim 1, wherein the instruction module further includes instructions that, when executed by the processor, cause the processor to:
instruct one or more actuators of the vehicle to cause the vehicle to park in the residential garage taking into account an egress need of the occupant.

5. The system of claim 1, wherein the instruction module further includes instructions that, when executed by the processor, cause the processor to:
generate an electronic representation of an environment that the vehicle is parked; and
update the electronic representation when subsequent vehicle sensor data is obtained.

6. The system of claim 1, wherein the processor is further configured to generate the path that has a greater width between objects when the vehicle sensor data indicates that the occupant uses a mobility aid, wherein the mobility aid includes at least one of: a wheelchair and crutches.

7. The system of claim 1, wherein the processor is further configured to determine the path based on a presence of a detected object in the residential garage and a smell associated with the detected object.

8. The system of claim 1, wherein the processor is further configured to inquire whether the occupant needs assistance when the occupant is detected as no longer moving along the path.

9. A method comprising steps of:
determining, based on vehicle sensor data, a path from a vehicle parked in a residential garage to a door leading to a residence associated with the residential garage for an occupant of the vehicle to utilize after exiting the vehicle;
providing information regarding the path to the occupant of the vehicle; and
providing feedback to the occupant as the occupant moves from the vehicle to the door using the path by monitoring a movement of the occupant along the path using the vehicle sensor data.

10. The method of claim 9, further comprising steps of:
generating a birds-eye-view of an environment that the vehicle is parked within based on the vehicle sensor data and a representation of the path within the birds-eye-view; and
displaying the birds-eye-view of the environment and the representation of the path to the occupant.

11. The method of claim 9, further comprising transmitting the information regarding the path to a mobile device that is configured to provide the information regarding the path to the occupant.

12. The method of claim 9, further comprising steps of:
instructing one or more actuators of the vehicle to cause the vehicle to park in the residential garage taking into account an egress need of the occupant.

13. The method of claim 9, further comprising the steps of:
generating an electronic representation of an environment that the vehicle is parked; and
updating the electronic representation when subsequent vehicle sensor data is obtained.

14. The method of claim 9, further comprising generating the path that has a greater width between objects when the vehicle sensor data indicates that the occupant uses a mobility aid, wherein the mobility aid includes at least one of: a wheelchair and crutches.

15. The method of claim 9, further comprising determining the path based on a presence of a detected object in the residential garage and a smell associated with the detected object.

16. The method of claim 9, further comprising utilizing an audible output device to inquire whether the occupant needs assistance when the occupant is no longer moving along the path.

17. A non-transitory computer-readable medium including instructions that, when executed by a processor, cause the processor to:
determine, based on vehicle sensor data, a path from a vehicle parked in a residential garage to a door leading to a residence associated with the residential garage for an occupant of the vehicle to utilize after exiting the vehicle;
provide information regarding the path to the occupant of the vehicle; and
provide feedback to the occupant as the occupant moves from the vehicle to the door using the path by monitoring a movement of the occupant along the path using the vehicle sensor data.

18. The non-transitory computer-readable medium of claim 17, further including instructions that, when executed by the processor, cause the processor to:
generate a birds-eye-view of an environment that the vehicle is parked within based on the vehicle sensor data and a representation of the path within the birds-eye-view; and
display the birds-eye-view of the environment and the representation of the path to the occupant.

19. The non-transitory computer-readable medium of claim 17, further including instructions that, when executed by the processor, cause the processor to inquire whether the occupant needs assistance when the occupant is detected as no longer moving along the path.

20. The non-transitory computer-readable medium of claim 17, further including instructions that, when executed by the processor, cause the processor to generate the path that has a greater width between objects when the vehicle sensor data indicates that the occupant uses a mobility aid, wherein the mobility aid includes at least one of: a wheelchair and crutches.

* * * * *